Patented Nov. 23, 1937

2,100,250

UNITED STATES PATENT OFFICE 2,100,250

PROTECTIVE COATING FOR TENNIS STRINGS AND THE LIKE

George Victor Heyl, Chicago, Ill., assignor to Johnson & Johnson, New Brunswick, N. J., a corporation of New Jersey No Drawing. Application December 31, 1934, Serial No. 760,051

3 Claims. (Cl. 149—1)

The invention relates to tennis strings and the like, the object being to provide a durable, smooth and frictionless protective coating which greatly will enhance the general quality and service value of tennis strings.

Heretofore, gut and the like strings for tennis rackets have been treated with protective coatings of either the volatile or aqueous type. Neither expedient is satisfactory. The volatile type, regardless of the nature of the resinous component (including pyroxylin) possesses "a resinous tack" which inhibits maximum tightening in stringing. The aqueous type, it is true, under favorable conditions, makes for a smooth frictionless surface but, suffers the disadvantage that, owing to the hygroscopic character of the stock (vegetable gums, starch, mucilage, etc.) it is not durable in that it lacks effective moisture-resisting properties. The suggested admixture of rubber to such organic colloids, as glue or casein, failed of its purpose because it still left the product with an objectionable tack. So also, the use of aldehydes, in conjunction with organic colloids, to harden the coating, have been detrimental because it tends to impair or destroy the resiliency and durability of collagen strings.

The nature of the invention consists in film coating gut and the like strings with a solution of an organic colloid and a substance adapted to have a more or less catalytic action and to promote the curing of the film. By catalytic action is meant the ability to transmit oxygen upon exposure to air and sunlight. Such substance is the reaction product of ammonia with the hydroxide of a suitable divalent metal.

The invention may be exemplified in various ways:

Example A $\frac{1}{10}$ gm. mol. of chloride of cobalt (mol. wt. 237.99) or 23.8 gms. are dissolved under stirring in 1000 ccs. of water at 30° C. and the resulting hydroxide is precipitated by the addition of 11.5 gms. of potassium hydrate dissolved in 300 ccs. of water. The precipitated hydroxide is then washed by decantation until the hydrogen-ion concentration of the water is about 8.50. The water is then drawn off and the hydroxide filtered, washed again and centrifuged and dissolved in 400 ccs. of ammonia, sp. gr. 0.900 and again filtered, if necessary. In the meantime 100 gms. of an organic colloid such as for example, starch are dissolved in a small quantity of boiling water (300 ccs.) or more, if necessary, depending on the grade of the colloid, to which then is added the ammoniacal solution of the cobaltous hydrate. A suitable preservative may be added, if necessary, or desirable. The solution is then ready for use.

Example B $\frac{1}{10}$ gm. mol. of nickel sulphate (mol. wt. 262.85) are dissolved in 1000 ccs. of water at 30° C. and the nickel hydrate precipitated with 11.00 gms. of potassium hydrate, flooded, washed by decantation, filtered and centrifuged. The hydrogen-ion concentration of the final wash water should not be higher than 8.50 at 20° C. The hydroxide paste with an average moisture content of 40% is then dissolved in ammonia, sp. gr. 0.9000, the azure blue extract filtered, if necessary, and added to the solution of the organic-colloid, which may be composed of 108 gms. of gum arabic in 225 ccs. of water. After the addition of a suitable preservative, the solution is ready for use.

In order to determine definitely the effect of the catalytic action so-called of the metallic salt, newly polished tennis strings were coated with a cobalt colloid solution and dried, some in vacuo and some in the open at room temperature. The coating on the vacuum dried strings was easily removed by the application of a wet rag whereas the air dried strings remained intact and smooth and did not swell when immersed in water at 20° C. over a test period of twenty minutes.

I have discovered that the hardness of an aqueous coating on tennis gut is closely linked with the interfacial hydrogen-ion concentration, i. e. the hydrogen-ion concentration prevailing at the zone of contact between gut surface and coating surface. If, for instance, the hydrogen-ion concentration of the latter is relatively high (pH 2.00 to pH 4.00) against the normal hydrogen-ion concentration of an untreated tennis string, which is between 7.2 and 8.2, the dry coating will be found to be poorly bonded to the gut, due principally to the presence of minute layers of salt between the gut surface and the coating. In time, the presence of salts and the relatively high hydrogen-ion concentration of the coating will be found to have a slight tanning effect on the collagen, the strings becoming brittle and therefore weak in tensile strength.

If, on the other hand, the hydrogen-ion concentration of the coating fluid is kept within the pH-range of the gut, durable and well bonded protective films can be obtained. However, an aqueous coating fluid composed of a mechanical mixture of a neutral divalent metal hydroxide and a suitable organic-colloid, does not form a moisture and wear resistant film on a gut string, even though the hydrogen-ion concentration may be within the above named pH-range (pH 7.2–8.2). Microscopic examination revealed large particles of hydroxide dispersed throughout the coating. These caused open pores and an uneven surface, making such a string unfit for practical use. The particle size of the coating substance had to be reduced to a minimum in order to produce a closely knitted film surface. For this purpose the metal hydroxide was dissolved by the application of ammonia, thus producing a different state of ions, the soluble metal hydroxide being combined with a suitable organic-colloid.

In some cases non-sedimentating solutions are thus obtained; in other cases, slight sedimentation takes place on standing. This depends on the choice of organic-colloid. Both kinds of coating solutions or dispersions, respectively, will produce protective and non-friction films on tennis gut, provided the metal hydroxide component is a true solution.

The vapor phase is lost by escape of the ammonia gas, shortly after the coating and this is followed immediately by the hardening oxidation process which is usually completed within a period of thirty-six hours, more or less, at room temperature.

Of the divalent metal ions commonly known, some are more satisfactory than others. It has been found that the hydroxide of those metals which are poorly soluble in ammonia and more soluble in ammonium chloride, for instance, give less satisfactory coatings and, evidently, the durability of the film is generally dependent on the basic quality of the hydrate.

Of the organic-colloids employed, it has been found that the starches and some of the vegetable gums yield better films than the proteids.

It will be understood that the improved method, and its product, regularly lends itself to the use of such lubricants such as soaps, oils, soluble shellac, etc., and such use is contemplated.

Having described the invention, what is claimed as new is:—

1. A tennis string having a protective coating comprising an organic colloid and a substance calculated to transmit oxygen upon exposure to air whereby it is substantially self curing, said substance comprising the reaction product of ammonia with the hydroxide of a suitable divalent metal.

2. A relatively hard protective coating for collagen strings and the like, comprising a solution of an organic colloid and a substantially concentrated reaction product of ammonia with the hydroxide of nickel, responsive to air-drying.

3. Method of treating gut and the like strings to make them water and wear resistant, which consists in filming them with a solution of an organic colloid and the reaction product of ammonia and hydroxide of nickel, and air-drying the film.

GEORGE VICTOR HEYL.